Patented Aug. 11, 1925.

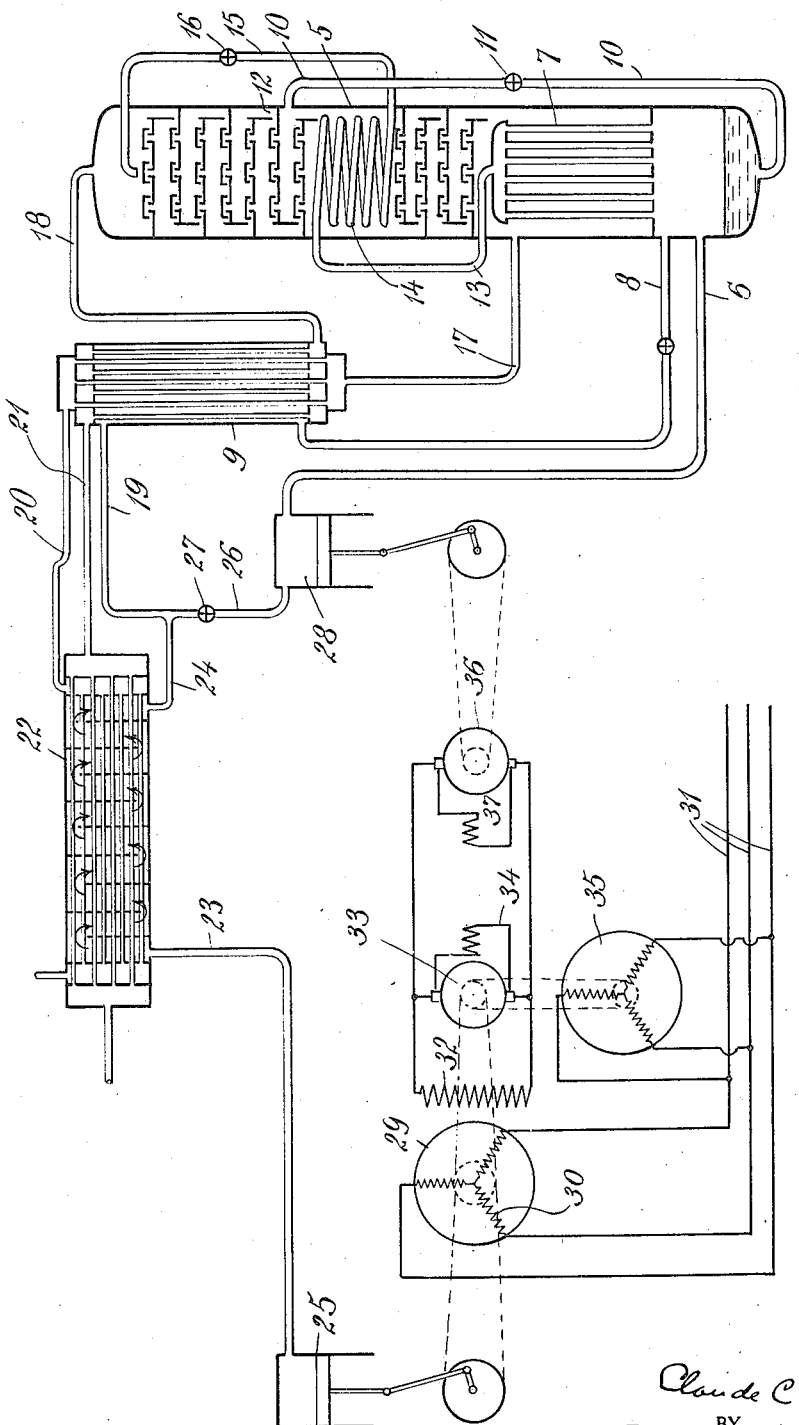

1,549,236

UNITED STATES PATENT OFFICE.

CLAUDE C. VAN NUYS, OF CRANFORD, NEW JERSEY, ASSIGNOR TO AIR REDUCTION COMPANY, INCORPORATED, OF NEW YORK, N. Y., A CORPORATION OF NEW YORK.

REFRIGERATION.

Application filed October 23, 1924. Serial No. 745,357.

*To all whom it may concern:*

Be it known that I, CLAUDE C. VAN NUYS, a citizen of the United States, residing at Cranford, in the county of Union, State of New Jersey, have invented certain new and useful Improvements in Refrigeration; and I do hereby declare the following to be a full, clear, and exact description of the invention, such as will enable others skilled in the art to which it appertains to make and use the same.

This invention relates to refrigeration involving expansion of compressed gases with external work to produce low temperatures, and particularly to the application of electrical power in initially compressing the gas and in the recovery and utilization of energy from the compressed gas.

The invention will be described more particularly with reference to liquefaction systems such as are employed in liquefying air and in separating the constituents thereof, but the invention is of more general application and can be utilized wherever a gas is compressed and subsequently expanded with external work.

In liquefaction systems the gaseous mixture treated is initially compressed to a relatively high pressure and the compressor is driven usually by an electric motor. Synchronous motors are used almost exclusively because of their high efficiency and of the fact that electric current for power purposes is commonly of the alternating type.

To produce the necessary refrigeration all or a portion of the compressed gas is expanded in a reciprocating or rotary engine. It is customary to connect the expander to a direct current generator and to waste the current through a resistance grid. The current might be utilized otherwise, but owing to necessary variations in the pressure and amount of the working fluid the quantity of current produced is variable and it would serve ordinarily no useful purpose.

It is the object of the present invention to avoid the waste of energy represented by the heat developed in the resistance and to utilize this energy in the reduction of the energy consumed in initially compressing the gas.

Other objects and advantages of the invention will be apparent as it is better understood by reference to the following specification and accompanying drawings which illustrates diagrammatically the preferred arrangement of the apparatus. In order that the invention may be clearly understood it is illustrated in connection with a liquefaction system of the Claude type.

In carrying out the invention the compressor is driven by a synchronous motor which is provided with an exciting circuit. The latter is fed from a direct current generator which may be connected directly to the shaft of the motor or may be actuated by a separate induction motor to which it is connected. The principal motor is supplied with current from a power line of the usual kind, a three-phase current being that normally supplied.

In starting the synchronous motor operates as an induction motor and when it has reached the speed required for synchronism the circuits are changed. The direct current generator then operates to feed current to the windings of the synchronous motor, either under the actuation thereof or of its separate driving motor.

When another direct current generator is connected in parallel with the exciting generator the latter will operate as a motor as soon as the direct current power requirements of the synchronous motor have been fulfilled and to the extent that the available current exceeds these requirements the exciting generator will add its torque to that of the synchronous motor and will assist the latter in overcoming the load. If, instead of being driven from the synchronous motor the exciter is driven by a separate induction motor, the latter will be driven whenever the direct current exceeds the requirements of the synchronous motor and will act as a generator producing current having the same characteristics as that fed from the power line to the synchronous motor. The current may be returned, therefore, directly to the power line and may be delivered thereby to the synchronous motor.

The invention is particularly useful inasmuch as it provides for the direct return of energy recovered from an expanding gas in a simple and efficient manner. The control, moreover, is automatic and is not affected by variations due to the change in the rate of expansion. If the power returned falls at any time below that required by the synchronous motor, the exciter becomes immediately a direct current generator to supply the necessary current. When the supply of direct current increases the exciter again takes up its portion of the load and assists the synchronous motor or causes current to be delivered to the power line. Perfect balance in the utilization and recovery of electrical energy is thus assured.

Referring to the drawing, 5 indicates a column in which the liquefaction and separation of the gaseous mixture, for example, air, is carried out. The air entering the bottom of the column through pipe 6 passes upwardly through a plurality of tubes 7 in a vaporizer in which the tubes are surrounded by accumulated liquid. The liquid is evaporated in causing a partial liquefaction of the entering air and the liquid formed in the tubes flows backwardly, and in accordance with the well known principles of "backward return" it becomes enriched in the more readily condensable constituent, for example, oxygen. This liquid is augmented by liquid supplied through a pipe 8 from a liquefier 9 and the combined liquids are delivered through a pipe 10 controlled by a valve 11 to a rectification compartment 12 in which the liquid flows downwardly in contact with vapors rising from the lower part of the column. To ensure a more complete separation the residual liquefied gas from the tubes 7 is delivered through a pipe 13 to a coil 14 in the upper part of the column where it is liquefied and thence conveyed through a pipe 15 and valve 16 to the top of the column. In case air is treated this liquid is substantially pure nitrogen. The result of the rectification is a liquid which when evaporated furnishes one of the products of the column and an effluent which escapes from the top of the column. The vaporized liquid is delivered through a pipe 17 and the effluent passes off through a pipe 18. Both of these pipes are connected to compartments in the liquefier 9 which is provided with tubes through which the products are carried in heat-exchange relation with the compressed gas such as air which enters the liquefier through a pipe 19. After passing through the liquefier the products are delivered through pipes 20 and 21 to an exchanger 22 where a further heat exchange occurs between the compressed gas entering through a pipe 23 and escaping through a pipe 24. After giving off their cold to the entering compressed gas the products are withdrawn from the exchanger and utilized for any desired purpose.

The air or other gas is compressed in a compressor 25 which may be in several stages and which discharges to the pipe 23. After being cooled in the exchanger the compressed air passes through the pipe 24 and a portion is diverted to the pipe 19 through the liquefier 9. The balance passes through a pipe 26 controlled by a valve 27 to an expander 28 which, as illustrated, is of the reciprocating type, though a rotary expander such as a turbine could be used. The expanded gas is delivered to the column as hereinbefore stated through the pipe 6.

The compressor 25 is driven by a synchronous motor 29 of the induction type having variable resistances 30 connected to the rotor. The motor is supplied by a three-phase power line 31. The motor 29 is also provided with an exciting field winding 32 which is supplied by direct current from a shunt wound generator 33, the shunt field winding being indicated at 34. This generator may be driven directly by the synchronous motor or, as indicated in the drawing, a separate induction motor 35 may be connected thereto.

The expander 28 is connected directly or by suitable means to a direct current generator 36 having a shunt field winding 37. This generator is adapted to be driven by the expander.

The apparatus described is that usually employed in a liquefaction plant where for many years it has been customary to connect the terminals of the generator 36 to a resistance through which the current is wasted. When operated in this manner the energy recovered in expanding the gas is wholly lost since it serves no useful purpose.

According to the present invention the direct current generator 36 is connected in parallel with the generator 33 so that the energy recovered in expanding the gas is converted into electrical energy which is in turn delivered to the exciting circuit of the synchronous motor. As hereinbefore explained, when the quantity of current in this circuit exceeds the requirements of the synchronous motor, the generator 33 will act as a motor and to the extent that the current requirements of the synchronous motor is exceeded the generator 33 will assist the motor in driving the compressor 25 provided that there is a mechanical connection between the synchronous motor 29 and the generator 33 as in the case where they are connected to the same shaft. If, on the other hand, a separate induction motor 35 is employed to drive the generator 33, this induction motor will act as a generator when the current requirements of the synchronous motor are exceeded and the induction motor can be regulated through variation of the resistances in the rotor circuit to return current to the power line having the same characteristics as the current delivered to the synchronous motor 29. In both cases, therefore, the energy recovered by the expansion of the gas is utilized directly in the compression of further quantities of gas and the power requirements of the system are reduced to a corresponding extent.

The invention provides for a considerable saving in the operation of liquefaction plants or of apparatus designed for general refrigeration or for any purpose in which a gas is compressed and subsequently expanded. It avoids a loss which has characterized all such operations as heretofore conducted and presents a further considerable economic advantage owing to the saving of power.

Various changes may be made in the details of the operation and in the structures employed without departing from the invention or sacrificing the advantages set forth.

I claim:—

1. A method of refrigeration, which comprises compressing a gas with the expenditure of electrical power, expanding the gas to recover energy therefrom, converting the recovered energy into electrical power and utilizing the recovered electrical power in compressing the gas.

2. A method of refrigeration, which comprises compressing a gas with the expenditure of electrical power, expanding the gas to recover energy therefrom, converting the recovered energy into electrical power differing from that employed in compressing the gas and utilizing the recovered electrical power to assist in the compression of the gas.

3. A method of refrigeration, which comprises compressing a gas with the expenditure of electrical power of the alternating current type, expanding the gas to recover energy therefrom, converting the recovered energy into electrical power of the direct current type and utilizing the recovered electrical power to assist in the compression of the gas.

4. A method of refrigeration, which comprises compressing a gas with the expenditure of electrical power of the alternating current type and of direct current for excitation, expanding the gas to recover energy therefrom, converting the recovered energy into electrical power of the direct current type and utilizing the recovered electrical power for excitation.

5. In a refrigerating apparatus the combination of a compressor, an expander, a synchronous motor to drive the compressor, a direct current exciting generator mechanically connected to the motor and electrically connected to the exciting circuit thereof and a direct current generator driven by the expander and electrically connected in parallel with the exciting generator.

6. In a refrigerating apparatus the combination of a compressor, an expander, a synchronous motor to drive the compressor having a direct current exciting circuit and means actuated by the expander to supply direct current to the exciting circuit.

In testimony whereof I affix my signature.

CLAUDE C. VAN NUYS.